United States Patent [19]

Spiess

[11] Patent Number: 5,652,705
[45] Date of Patent: Jul. 29, 1997

[54] HIGHWAY TRAFFIC ACCIDENT AVOIDANCE SYSTEM

[76] Inventor: Newton E. Spiess, 1379 SW. Albatross Way, Palm City, Fla. 34990

[21] Appl. No.: 533,068

[22] Filed: Sep. 25, 1995

[51] Int. Cl.$^6$ ........................................ G08G 1/16
[52] U.S. Cl. ........................................ 364/436
[58] Field of Search ........................ 364/436, 437, 364/438, 439, 496, 497, 498, 499, 550, 551.01; 340/933, 934, 935, 396, 937, 541, 905; 342/44

[56] References Cited

U.S. PATENT DOCUMENTS

| | | | |
|---|---|---|---|
| 3,618,003 | 11/1971 | Marshall | 340/31 |
| 3,689,878 | 9/1972 | Thieroff | 340/31 R |
| 3,778,764 | 12/1973 | Kamb | 340/81 R |
| 3,870,991 | 3/1975 | Hayes | 340/41 R |
| 4,491,840 | 1/1985 | Nishikawa et al. | 340/903 |
| 4,590,455 | 5/1986 | Frizieger | 340/907 |
| 4,600,913 | 7/1986 | Caire | 340/104 |
| 4,827,258 | 5/1989 | Evans | 340/929 |
| 4,847,618 | 7/1989 | Baustin | 340/929 |
| 4,857,921 | 8/1989 | McBride et al. | 340/912 |
| 5,070,334 | 12/1991 | Commissaire et al. | 342/43 |
| 5,134,393 | 7/1992 | Henson | 340/933 |
| 5,249,157 | 9/1993 | Taylor | 340/903 |
| 5,264,854 | 11/1993 | Spiess | 342/44 |
| 5,268,692 | 12/1993 | Grosch et al. | 342/70 |
| 5,270,708 | 12/1993 | Kamishima | 340/995 |
| 5,278,563 | 1/1994 | Spiess | 342/44 |
| 5,289,183 | 2/1994 | Hassett et al. | 340/905 |
| 5,301,239 | 4/1994 | Toyama et al. | 382/1 |
| 5,369,591 | 11/1994 | Broxmeyer | 364/461 |
| 5,396,429 | 3/1995 | Hanchett | 364/436 |
| 5,404,306 | 4/1995 | Mathur et al. | 364/436 |
| 5,416,711 | 5/1995 | Gran et al. | 364/436 |
| 5,420,794 | 5/1995 | James | 364/436 |
| 5,428,544 | 6/1995 | Shyo | 364/436 |
| 5,432,509 | 7/1995 | Kajiwara | 340/903 |
| 5,477,141 | 12/1995 | Näther et al. | 324/160 |
| 5,491,475 | 2/1996 | Rouse et al. | 340/933 |
| 5,504,683 | 4/1996 | Gurmu et al. | 364/436 |
| 5,521,579 | 5/1996 | Bernhard | 340/438 |
| 5,529,138 | 6/1996 | Shaw et al. | 180/169 |
| 5,530,651 | 6/1996 | Uemura et al. | 364/461 |
| 5,539,645 | 7/1996 | Mandhyan et al. | 364/438 |

OTHER PUBLICATIONS

Its America, Its Architecture Development Program, Ph1, Summary Report, Nov. 1994, pp. 32,33,34,35,36.
Calvin Sims, Putting Space Age Expertise in the Drivers Seat, New York Times, May 1, 1994 p. F7.
U.S. application No. 08/179521, Spiess, filed Jan. 10, 1994.

*Primary Examiner*—Kevin J. Teska
*Assistant Examiner*—Stephen J. Walder, Jr.

[57] ABSTRACT

An accident avoidance system in which a substantially continuous data stream consisting of multiple vehicle velocity and location information is processed by means that will generate advisories to vehicles that are approaching potentially hazardous situations. These advisories are in advance of the vehicles hazard encounter so that driver corrective action can be taken to avoid collision. For each vehicle along a monitored length of highway, means are provided for computing the vehicles actual acceleration or deceleration and for computing the deceleration required for the vehicle to avoid an accident. Collision avoidance advisories are generated whenever the vehicle's acceleration or deceleration deviates from the deceleration required to avoid a collision. Means are provided for detecting vehicles that may be operated by drivers whose performance is impaired.

6 Claims, 4 Drawing Sheets

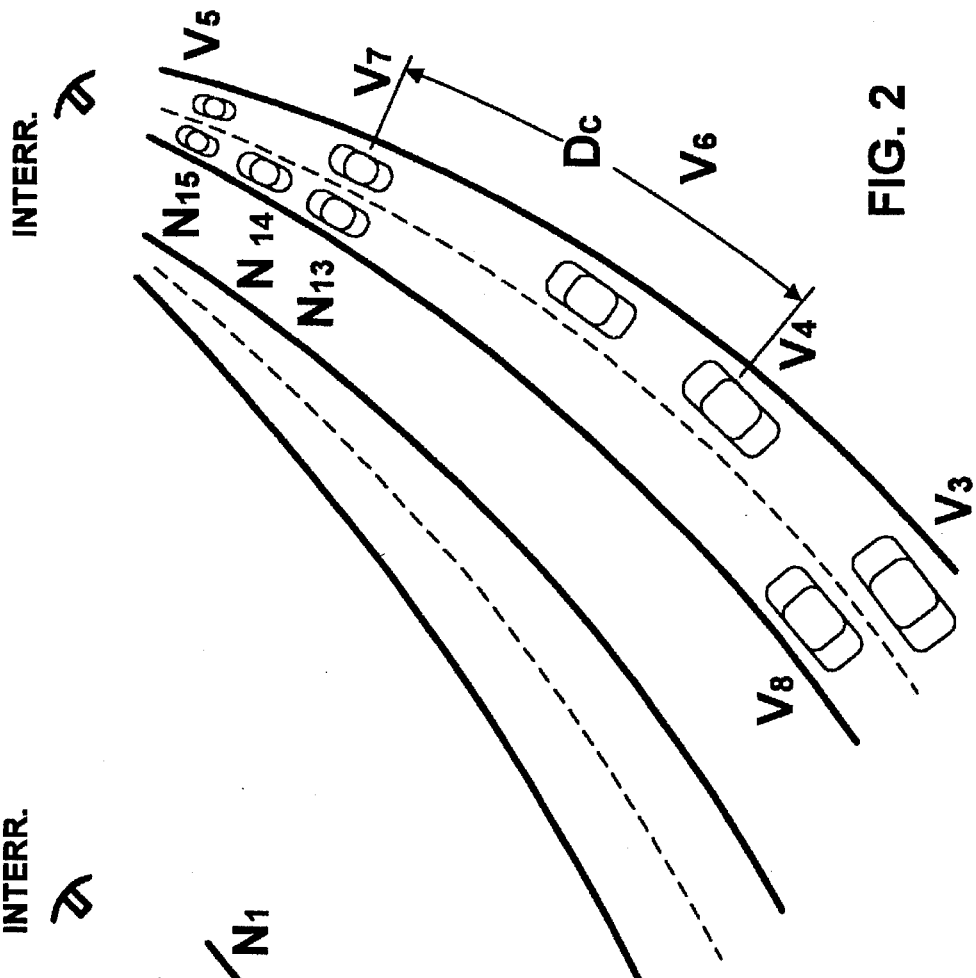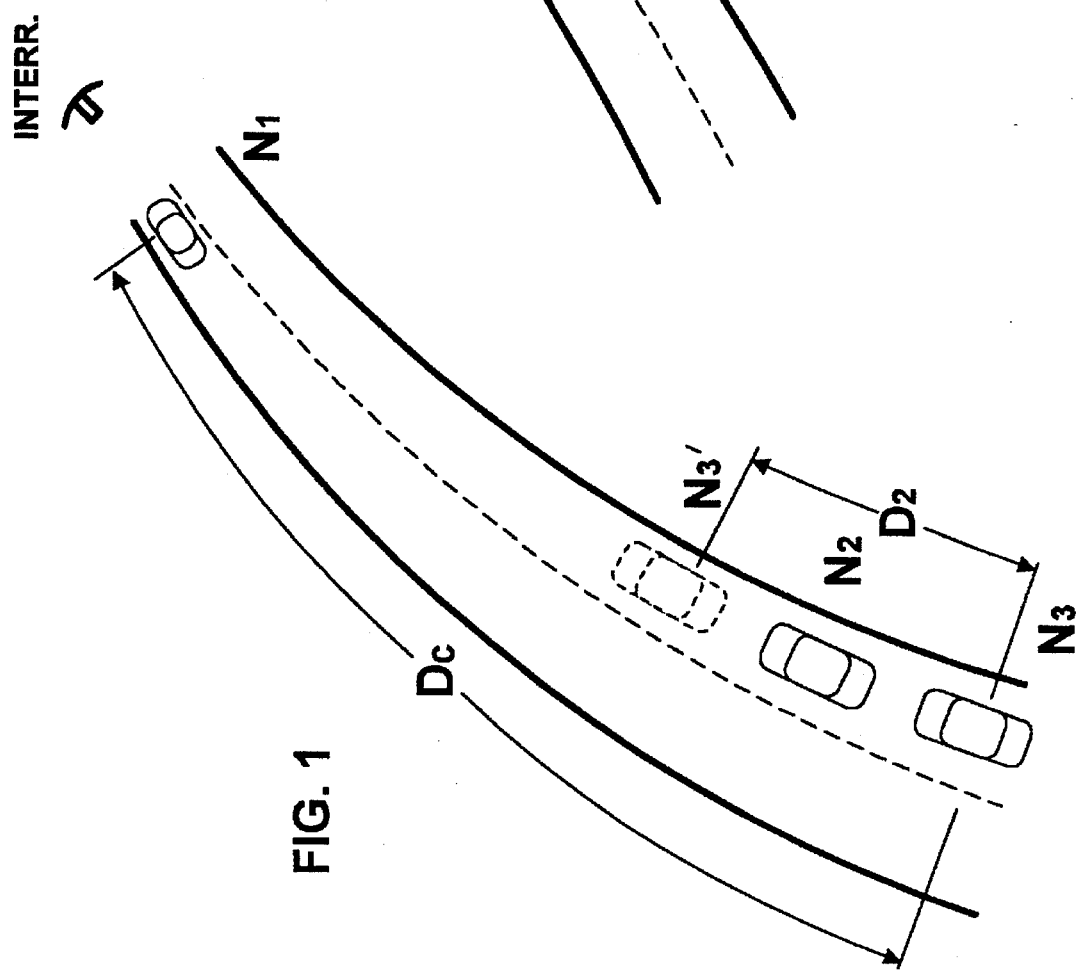

HIGHWAY TRAFFIC ACCIDENT AVOIDANCE SYSTEM

CROSS REFERENCE TO RELATED APPLICATIONS

This invention relates to the multiple transponder response repetition (RRI) variation and elements of the coherent signal processing of application Ser. No. 7/850,423 filed Mar. 12, 1992 and issued as U.S. Pat. No. 5,264,854 on Nov. 23, 1993. It relates to the coherent detection means for offset frequency vehicle mounted transponders and elements of the associated skin return tracking of transponder and non-transponder equipped vehicles of my application Ser. No. 07/941,716 filed Sep. 8, 1992 and issued as U.S. Pat. No. 5,278,563 on Jan. 11, 1994. It relates to the identification, classification and communication wave form, the velocity, location and identification data stream and the discrete address two-way communication capability of my copending application Ser. No. 08/179,521 filed Jan. 10, 1994.

BACKGROUND

1. Field of the Invention

This invention relates to the processing of a data stream that includes the velocity and location of multiple vehicles operating on monitored lengths of highway so as to generate warnings and/or commands that will eliminate or mitigate the development of accident situations. Systems of this type must provide effective warnings or commands in a variety of crash situations. The United States Department of Transportation has defined these as including, but not limited to, "Rear-end Crash Warning and Control," "Head on Crash Warning and Control," "Passing Warning," "Backing Crash Warning," "Lateral Collision Avoidance," "Intersection Crash Warning," and the avoidance of collisions caused by "Impaired Drivers."

Systems of this type must exhibit low false alarm rates and avoid the generation of commands not warranted by developing traffic situations. High false alarm rates will result in driver loss of confidence and cause traffic delays that cannot be tolerated in congested traffic environments.

Information must be conveyed to drivers sufficiently in advance of the vehicles arrival at a hazard so that even a tired inattentive driver will have time to respond.

Information must not be provided so far in advance that a tired driver will forget that action is required.

2. Discussion of Prior Art

The enhancement of highway traffic safety and the associated improvement in highway capacity that results from reduction of accident related delays has commanded the attention of inventors for many years. As summarized in the Department of Transportation "IVHS Architecture Development Program" report of April 1994, efforts have often been directed toward providing an array of sensors on vehicles that will detect the proximity of other vehicles and warn the driver, for example, that he is too close to the vehicle ahead or that there is a vehicle in an adjacent lane. In one suggested design there are 8 radiating sensor elements and displays on a given vehicle which are intended to provide protection against collision. Systems of this type have been field tested and even deployed on critical vehicles such as school buses. In general, they have been proven to be impractical for the following reasons.

a—Acoustic or R.F. vehicle mounted sensors can determine spatial relationships of immediately adjacent vehicles but they cannot determine activity of vehicles that are several vehicles in front of or behind the instrumented vehicle nor can they adequately detect intrusion by side street vehicles. They are therefore ineffective in preventing multi-car pile ups and intersection collisions.

b—Vehicle mounted sensors can, to a limited extent, advise the driver of the instrumented car that he should modify his behavior in order to avoid hazards but they do not prevent the drivers of non-instrumented vehicles from creating hazardous situations that will adversely affect the instrumented vehicle. For example, it is small consolation for a driver to know that he is about to be rear ended by a vehicle that cannot stop behind him. All he can do is brace himself and hope for the best.

c—In normal congested multi-lane highway traffic, vehicle mounted sensors and the associated software generate such a high false alarm rate that drivers simply ignore them.

d—The combination of vehicle mounted sensors that might reasonably mitigate all possible accident situations is so complex and costly that they could not be expected to be on a large percentage of vehicles nor are they likely to be mandated by Federal authorities.

Recognizing the limitations of vehicle mounted sensors, various attempts have been made to use off vehicle devices. These attempt to monitor traffic with sufficient precision to allow effective, low false alarm rate advisories to be communicated to drivers. They have failed for two reasons:

a—Until the inventions of Spiess U.S. Pat. No. 5,264,854 and Spiess U.S. Pat. No. 5,278,563 and my copending application Ser. No. 08/179,521, off vehicle systems lacked the required accuracy in terms of vehicle location and speed. They also lacked the ability to operate satisfactorily in very dense vehicle environments and were effective only in detecting specially equipped vehicles.

b—Software presently in existence is not capable of analyzing a complex data stream of multiple vehicle position and velocity information and in turn deriving low false alarm probability safety advisory information that can be communicated to the drivers of many vehicles operating along a monitored highway.

OBJECTS AND ADVANTAGES

Accordingly, several objects and advantages of the present invention are:

a—to provide digital processing means that accepts closely spaced multiple vehicle range and velocity data and establishes track files on each vehicle that includes a time history of the vehicle's location, velocity, acceleration and identification.

b—to provide digital data processing means which operate on the track file data and which determine if and when specific vehicles are approaching a hazardous situation.

c—to provide further digital processing means which generate warnings and advisories that precede a vehicle's arrival at a hazardous situation by an interval of time that exceeds the corrective action response time of drivers.

d—to provide means for formatting the commands and advisories so that they can be communicated to the infrastructure of existing and newly developed traffic signals and driver communication devices.

e—to provide means for formatting the commands and advisories so that they can be addressed to specific vehicles that can benefit from the information.

A further object and advantage of the invention is to process the vehicle data and communicate information to the vehicles within a time period that is small when compared to the response time of the driver and to the time required for potentially hazardous situations to reach a critical level.

It is also an object and advantage of the invention to warn drivers of the hazards caused by erratically or irresponsibly operated vehicles and to enable law enforcement authorities to locate and remove such vehicles from the environment.

DRAWING FIGURES

FIG. 1 shows a typical two-lane highway situation where an interrogator of the type defined in copending application Ser. No. 08/179,521 is mounted in such a manner and projects an antenna receive and transmit pattern such that it is able to monitor traffic on a curved section of roadway. Vehicles are illustrated at various ranges from the interrogator, moving at different speeds and in different directions. Means are provided to generate warnings that will eliminate the possibility of a head-on collision when an overtaking vehicle that is unaware of opposite direction traffic attempts to pass a slower vehicle.

FIG. 2 shows a typical four-lane divided highway situation where an interrogator of the type defined in copending application Ser. No. 08/179,521 is mounted in such a manner and projects an antenna receive and transmit pattern which allows it to monitor an extended length of highway. Means are provided to generate warnings that will eliminate the possibility of rear end collisions even when drivers are unaware of deteriorating conditions ahead and when driver's attention has been dulled by many hours on the road.

FIG. 3 illustrates the memory map of data from the interrogator as stored in the interrogator computer memory. Information on specific vehicle's identity and velocity as determined by transponder response and by vehicle skin reflection is stored as a function of vehicle range from the interrogator and as a function of the time when the measurements were made. The computed vehicle acceleration is also stored and associated with a particular vehicle.

DESCRIPTION

Figure 3:
Figure 4:
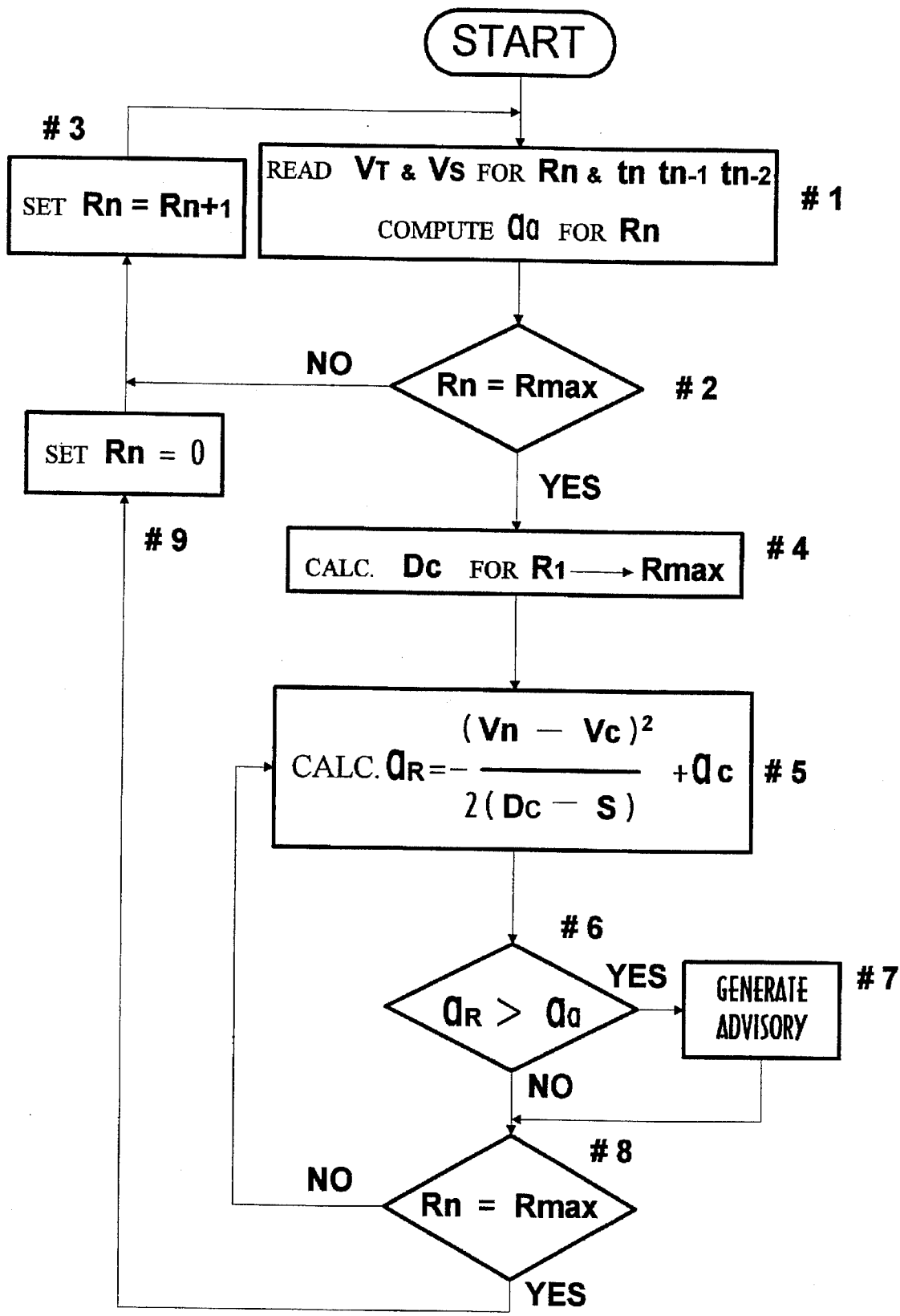
FIG. 4 illustrates software operations of the invention that are performed in order to insure that every vehicle within the monitored length of roadway will be able to slow sufficiently to avoid collision with another vehicle, lane departure at a turn in the road, or an intersection collision due to failure to stop for crossing traffic.
Figure 5:
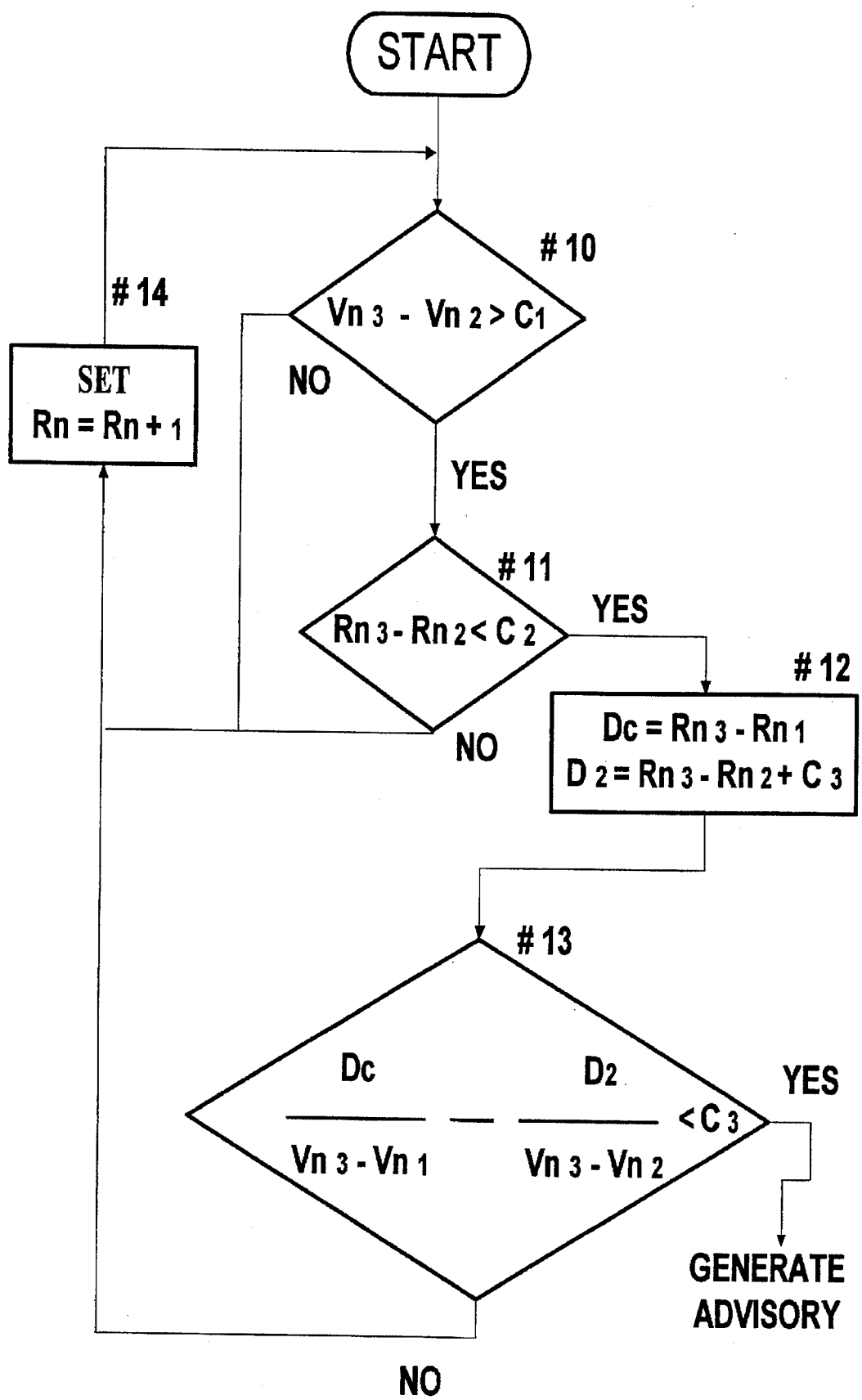
FIG. 5 illustrates additional software operations that must be performed in order to avoid head-on collisions in passing situations on two-lane undivided highways.

A typical embodiment of the present invention is illustrated in FIG. 1, FIG. 2, FIG. 3., FIG. 4 and FIG. 5.

FIG. 1 and FIG. 2 illustrate typical highway situations which are to be monitored and for which advisories are to be generated. These advisories serve the purpose of avoiding or at least mitigating the potential for accidents on the monitored length of highway.

FIG. 1 and FIG. 2 show an interrogator of the type described in copending application Ser. No. 08/179,521 mounted so that it can establish the identity, range and velocity of vehicles on the road. The identity numbers assigned to each vehicle are of two types. Vehicles that are equipped with transponders that are compatible with the interrogator signal are identified by a vehicle identification number that is unique to each vehicle. Vehicles that are not equipped with transponders are assigned an arbitrary identification number the first time they are detected by skin reflection of the interrogator signal. This number continues to be associated with a particular vehicle as long as it is being discretely tracked by the interrogator. This number may be passed on to successive interrogators as the vehicle passes from one interrogator zone to another.

Information on the vehicle identity range and velocity is received and decoded by the interrogator decoded/digital processor.

FIG. 3 illustrates means by which the decoded information may be mapped into the processor memory.

Each range resolution element of the decoder $R_n$ is assigned a memory location. That location provides addresses for the vehicle identification $I_D$, vehicle transponder derived velocity $V_r$, vehicle skin reflection derived velocity $V_s$ and a computed value of vehicle acceleration $a_a$. Addresses are provided for as many sets of data as there are lanes to be monitored. The first vehicle detected at a given range is entered in set $L_1$. If a second vehicle is detected at that range, it is entered in set $L_2$. In FIG. 3, only lanes with traffic flowing toward the interrogator are being monitored. Sign conventions are a plus for vehicles moving toward the interrogator and minus for vehicles moving away from it. Sign conventions are a plus for vehicles accelerating and minus for vehicles decelerating.

In a typical embodiment, the interrogator may operate at 10,000 interrogations per second. A 128-point fourier transform of the reflected skin returns in each range resolution element $R_n$ yields the skin return derived velocity $V_s$ of vehicles at that range. Transponders may be set to respond on average to one interrogation signal in 500. This return is processed to yield a transponder derived velocity $V_r$. Therefore a complete set of range, velocity and identification data on all vehicles within the interrogation range of the interrogator will be generated in one twentieth of a second or at a 20 per second rate. Successive data sets at successive increments in time, $t_n$, $t_{n-1}$, $t_{n-2}$, . . . are retained in memory.

Using the time sequence of data sets of FIG. 3, the interrogator digital processor of this invention solves the equations and logic of FIG. 4 to generate collision avoidance advisories. Means are provided to compare each vehicle's velocity and acceleration to the velocity and deceleration that is required to avoid involvement in a collision.

Referring to FIG. 4, the loops of step #1, step #2 and step #3 result in the computation of the actual acceleration $a_a$ that is to be associated with each vehicle in the FIG. 3 data set. Individual vehicle velocities at data set times $t_n$, time $t_{n-1}$ and time $t_{n-2}$, for example, are operated on by any one of many well known filter techniques to derive a smoothed value of acceleration consistent with the allowable data senescence. In the example cited, the senescence must, for example, be substantially less than the delay that is tolerable in generating a collision avoidance advisory.

The loop of FIG. 4, steps #1, #2 and #3 is repeated until an actual acceleration value $a_a$ has been computed for every vehicle.

The loop of FIG. 4, steps #4, #5, #6, #7, #8 and #9 define the unique advantages of this invention in terms of providing warning of impending disaster long before an accident is eminent. First, in step #4 a value of critical distance $D_c$ is computed for each vehicle. This critical distance is the distance from the particular vehicle to an obstruction or hazard that might impede its progress. In step #5 a value of required collision avoidance deceleration—$a_R$ is computed. This is the deceleration required to avoid a collision at the obstruction or hazard at critical distance $D_c$. The required deceleration is compared to the given vehicle actual deceleration $a_a$ in step #6. If the actual deceleration is less than the required deceleration, a warning is generated and transmitted to the vehicle that is at risk.

The process of FIG. 4, steps #4, #5 and #6 are repeated for each vehicle identified in the FIG. 3 current data set. As vehicles change range, velocity and acceleration as a function of time, the operation of the FIG. 4 loops and the generation of FIG. 3 data sets will result in real time warnings whenever a vehicle is found to be operating in a potentially hazardous situation. For the embodiment cited warnings will be generated within 0.1 sec. of the time a hazard arises. Depending on the magnitude of required deceleration, warnings at several levels of urgency can be communicated to transponder equipped vehicles with a time delay that is small compared to the response time of drivers and vehicles. Warnings to drivers of non-transponder equipped vehicles can be communicated via traffic signals and changeable overhead signs.

In the equation of step #5, the quantity $V_n$ is the velocity of the vehicle for which existence of a potential hazard is being computed. The quantity $V_c$ is the velocity of a potential hazard vehicle or other device. The quantity $a_c$ is the acceleration of the hazard vehicle or other device. The quantity S is a safety factor increment of distance that may be subtracted from the quantity $D_c$ to insure that the vehicle that receives a warning can stop or slow down before being involved in a collision.

The definition of the quantity S holds the key to the flexibility and effectiveness of this invention. Depending on the road conditions in terms of contour, traction, construction, intersection configuration and traffic density, the interrogator processor may be programmed as is necessary to insure safety on the length of road being monitored. The exact details of the application software will depend on the desires of the responsible traffic authority. The preferred implementation of the invention in typical accident avoidance situations is as follows:

a—In order to avoid rear end or multi-car pile up accidents, each vehicle's velocity and acceleration or deceleration is compared to the velocity and acceleration of vehicles ahead that are operating at lower velocity or that are decelerating. For example, referring to FIG. 2 and FIG. 3, vehicle V4 is operating 15 and 20 mph faster than vehicles N13 and V7 respectively. Furthermore N13 and V7 occupy all available lanes and are decelerating at a rate of 6 ft/sec/sec and 10 ft/sec/sec respectively. If in each range element the data set is equal to 50 ft., then the critical distance $D_c$ from V4 to N13 and V7 is 450 ft., entering this data into the equation of step #5 shows that V4 should be decelerating at 10.9 ft/sec/sec even if the traffic authority has elected to set the quantity S=0. Since its actual deceleration is 0 ft/sec/sec, the comparison of step #6 will indicate the need for an urgent advisory. As time advances and additional data sets are generated, this loop will continue to update the advisory for this and other vehicles that are approaching this potential pile up.

b—Intersection collisions are most often caused when vehicles fail to stop for traffic signals or signs and proceed into intersections that are being traversed by vehicles that have the right of way. This invention avoids these situations by issuing advisories whenever it senses a vehicle approaching a "stop" intersection at an inappropriate speed and deceleration.

The operation of the loop of steps #4, #5 and #6 generate an advisory whenever a vehicle's actual deceleration $a_a$ is less than the required deceleration $a_R$. Since the critical potential obstruction is in this case the intersection itself, $V_c$ and $a_c$, the velocity and acceleration of the obstruction respectively, will be zero. The critical distance $D_c$ will be the distance from the vehicle being investigated to the intersection. By repeating this process for all vehicles approaching an intersections, advisories can be generated not only to vehicles that are "running an intersection" but also to vehicles that are crossing the intersection and may be impacted by the errant vehicle. Advisories to vehicles about to cross an intersection that is being rendered unsafe by an errant vehicle may take the form of a message to transponder equipped vehicles and more generally may take the form of holding a red traffic signal to crossing traffic until the intersection is safe.

c—Lateral or lane departure collisions are most frequently caused by failure of a vehicle to negotiate a turn in the road generally as a result of entry into the turn at a speed that is too high for the existing road conditions. The logic of FIG. 4, steps #4, #5 and #6 generates warnings to the specific vehicle that is at risk if the required deceleration $a_R$ is greater than the measured deceleration $a_a$. When programmed to perform this functions, the steps #4, #5 and #6 set the critical distance $D_c$ equal to the distance from the risk vehicle to the critical section of the turn and the quantity $V_c$ is set equal to the maximum allowable velocity in the turn given the road conditions such as dry, wet or icing. The hazard acceleration is set equal to zero.

d—Head-on collision and passing warnings which will prevent accidents on two-lane roads require programming the interrogator to perform the additional equations and logic of FIG. 5. A typical traffic situation is illustrated in FIG. 1. When a passing situation develops as indicated by a vehicle at higher speed overtaking one at lower speed and travelling in the same direction, it is necessary to define a critical distance $D_c$ measured from the passing vehicle to interfering opposite direction traffic and a distance $D_2$ which is the distance the passing vehicle must advance relative to the passed vehicle before it can safely merge back into its own lane.

Referring to FIG. 5, step #10 determines that a vehicle is being overtaken. Step #11 determines that the overtaking vehicle is close to the slower vehicle. The quantities $C_1$ and $C_2$ are constants determined by the traffic authority. If these two conditions are satisfied, the logic assumes that a passing situation is about to occur. Step #12 computes the distance to opposite direction traffic $D_c$ and the distance $D_2$ that the passing vehicle must advance relative to the passed vehicle in order to safely re-enter its lane. Quantities $R_{n1}$, $R_{n2}$ and $R_{n3}$ are the distances of various vehicles from the interrogator. The quantity $C_3$ is a distance added as a safety factor. Step #13 computes the time required to reach a collision situation with the opposite direction traffic by dividing $D_c$ by the closing velocity of the two vehicles. Step #13 also computes the time to complete pass by dividing the quantity $D_2$ by the difference in velocity of the passing and passed vehicle. These two time quantities are compared and a warning is generated if the time to pass plus safety margin $C_3$ is greater than the time to collision.

Steps #10, #11, #12 and #13 are repeated for each vehicle along the monitored length of highway.

e—Impaired driver vehicle operation is detected by noting long term frequent deviations of the vehicle speed and acceleration from established norms. Referring to FIG. 3, Vehicle V8 has a velocity of 10 mph over the national speed limit and is still accelerating as it passes vehicle V3. While this situation may be acceptable to local enforcement authorities if it occurs for this vehicle only occasionally, the interrogator memory may be programmed to insert the deviation in memory and to pass the data point on to successive interrogators. If a consistent pattern of specific vehicle deviations is detected in successive data sets either in terms of speed or acceleration, the information may be data linked to traffic authorities and serve as probable cause for investigation. This invention relates to the use of long term speed and acceleration deviations from established norms as a means of detecting impaired driver vehicle operations.

What is claimed and desired to be secured by Letters Patent is:

1. Data processing means for generating highway traffic collision avoidance advisories or commands in which actual vehicle accelerations or decelerations are determined by means for differentiating a continuous time series of vehicle velocity measurements and required collision avoidance decelerations are determined by means for dividing twice the distance between an individual vehicle and a potential obstacle into the square of the difference in velocity between the individual vehicle and the potential obstacle, means for algebraically adding this quantity with the sign of the velocity difference retained to the actual acceleration or deceleration of the potential obstruction and means for generating collision avoidance advisories or commands when the required collision avoidance decelerations exceed actual vehicle decelerations.

2. Data processing means of claim 1 which memory means are used to record each incidence of advisory addressed to a specific vehicle and means for notifying traffic authorities when a specific vehicle's rate of advisory notification exceeds a pre-set number.

3. Data processing means of claim 1 in which rear end collisions are avoided by computing a required collision avoidance deceleration for all potential obstruction vehicles within a preprogrammed distance of the vehicle for which an advisory may be required and basing the advisory or command on the highest resulting required collision avoidance deceleration.

4. Data processing means of claim 1 in which intersection collisions are avoided by computing the collision avoidance deceleration required to bring each vehicle approaching a stop signal or sign to zero velocity in the distance from the vehicle to the stop signal or sign and generating advisories to vehicles if a vehicle's actual deceleration is less than the collision avoidance deceleration.

5. Data processing means of claim 1 in which road or lane departure accidents are avoided by computing the collision avoidance deceleration required to bring each vehicle approaching a turn in the road to a preset velocity that will allow the vehicle to safely negotiate the turn and by means that generate a warning or command to vehicles whose actual deceleration is less than the collision avoidance deceleration.

6. Data processing means for avoiding head-on collisions on bi-directional undivided highways which include means for processing a continuous time sequence of multiple vehicle position and velocity measurements means for comparing same direction vehicle position and velocity differences with pre-set constants to determine when one vehicle will pass another, means for determining the time to collision of vehicles determined to be in passing configuration with opposite direction vehicles, means for determining the time required for the passing vehicle to pass another and re-enter the passed vehicle lane and means for generating a warning if the time to collision with opposite direction vehicles is less than the time required to re-enter the passed vehicle lane.

* * * * *